US012609958B2

(12) United States Patent
Rakshit et al.

(10) Patent No.: US 12,609,958 B2
(45) Date of Patent: Apr. 21, 2026

(54) RECOMMENDATIONS FOR CYBERSECURITY BASED ON THREAT INTELLIGENCE

(71) Applicant: DigiCert, Inc., Lehi, UT (US)

(72) Inventors: Samir Kumar Rakshit, Bengaluru (IN); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 61 days.

(21) Appl. No.: 18/632,965

(22) Filed: Apr. 11, 2024

(65) Prior Publication Data

US 2025/0274482 A1 Aug. 28, 2025

(30) Foreign Application Priority Data

Feb. 27, 2024 (IN) .............................. 202441013986

(51) Int. Cl.
*H04L 9/40* (2022.01)

(52) U.S. Cl.
CPC ...... *H04L 63/1441* (2013.01); *H04L 63/0823* (2013.01)

(58) Field of Classification Search
CPC ........................ H04L 63/1441; H04L 63/0823
USPC .............................................................. 726/6
See application file for complete search history.

(56) References Cited

U.S. PATENT DOCUMENTS

| | | | |
|---|---|---|---|
| 9,077,546 B1 | 7/2015 | Rakshit | |
| 10,721,266 B1 * | 7/2020 | Herman-Saffar | ... H04L 63/1441 |

| | | | | |
|---|---|---|---|---|
| 2012/0246719 A1 * | 9/2012 | Bhamidipaty | ...... | H04L 63/1408 |
| | | | | 726/22 |
| 2016/0381057 A1 * | 12/2016 | Das | ...................... | H04L 63/1425 |
| | | | | 726/23 |
| 2018/0060575 A1 * | 3/2018 | El-Moussa | .............. | G06N 3/044 |
| 2020/0296136 A1 * | 9/2020 | Liu | ......................... | H04L 63/02 |
| 2021/0234889 A1 * | 7/2021 | Burle | ....................... | H04L 63/20 |
| 2021/0281585 A1 * | 9/2021 | Warikoo | ............. | H04L 63/1408 |
| 2023/0146804 A1 * | 5/2023 | Narula | ..................... | G06N 5/04 |
| | | | | 726/23 |
| 2023/0179639 A1 * | 6/2023 | Lee | ...................... | H04L 63/1433 |
| | | | | 726/1 |
| 2023/0300129 A1 | 9/2023 | Hojjati et al. | | |
| 2023/0344639 A1 | 10/2023 | Hojjati | | |
| 2023/0344650 A1 | 10/2023 | Hojjati | | |
| 2023/0385811 A1 | 11/2023 | Naidoo et al. | | |

* cited by examiner

*Primary Examiner* — Teshome Hailu

(74) *Attorney, Agent, or Firm* — Baratta Law PLLC; Lawrence A. Baratta, Jr.

(57) ABSTRACT

Systems and methods are provided for recommending a deployment of cybersecurity products according to threat intelligence pertaining to an organization. A method, according to one implementation, includes a step of extracting, from one or more sources, cybersecurity intelligence related to an online presence of an organization. The method also includes a step of analyzing the cybersecurity intelligence to determine a cybersecurity posture of the organization, where the cybersecurity posture is defined by at least a set of one or more cybersecurity issues. Also, the method includes a step of creating a cybersecurity product deploying recommendation to assist the organization with mitigating the set of one or more cybersecurity issues.

20 Claims, 4 Drawing Sheets

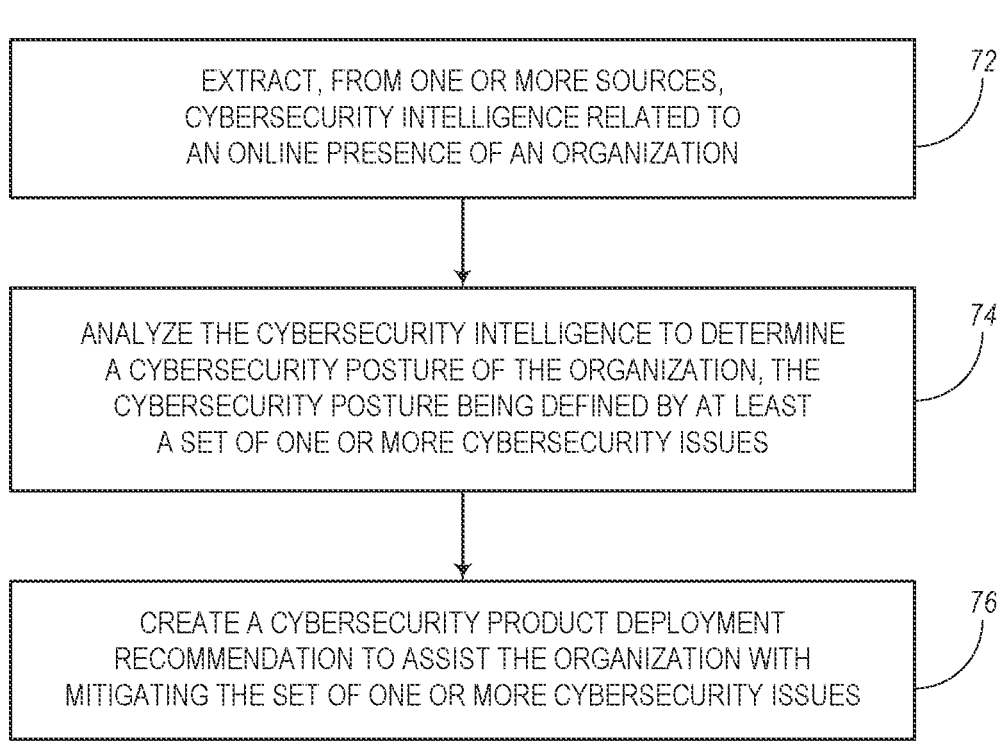

70

EXTRACT, FROM ONE OR MORE SOURCES,
CYBERSECURITY INTELLIGENCE RELATED TO
AN ONLINE PRESENCE OF AN ORGANIZATION

72

ANALYZE THE CYBERSECURITY INTELLIGENCE TO DETERMINE
A CYBERSECURITY POSTURE OF THE ORGANIZATION, THE
CYBERSECURITY POSTURE BEING DEFINED BY AT LEAST
A SET OF ONE OR MORE CYBERSECURITY ISSUES

74

CREATE A CYBERSECURITY PRODUCT DEPLOYMENT
RECOMMENDATION TO ASSIST THE ORGANIZATION WITH
MITIGATING THE SET OF ONE OR MORE CYBERSECURITY ISSUES

RECOMMENDATIONS FOR CYBERSECURITY BASED ON THREAT INTELLIGENCE

FIELD OF THE DISCLOSURE

The present disclosure relates generally to security on computing networks, i.e., cybersecurity. More particularly, the present disclosure relates to systems and methods for assisting an organization by offering recommendations for cybersecurity techniques based on threat intelligence.

BACKGROUND

Organizations having an online presence (e.g., websites, email, etc.) are often concerned about cybersecurity and preventing attackers from hacking into their systems and causing disruptions to the intended functionality of their resources. The organization will usually have a number of cybersecurity products in place to provide needed protection. As described herein, a cybersecurity product refers to a technique or approach for implementing cybersecurity. However, the process of determining what cybersecurity products are needed can often be hit or miss. Administrators that represent the organizations often do not know the actual status or posture of their organization in the realm of online security. Thus, the administrators may be unaware of what products have already been deployed and how well these products are performing. Also, administrators may be unsure about whether or not they should purchase one or more additional cybersecurity products and how effective these products might be for preventing future attacks. That is, there is no real correlation for what is needed based on actual intelligence.

BRIEF SUMMARY

The present disclosure relates to systems and methods for offering recommendations with respect to cybersecurity products and assisting an administrator with deployment decisions based on existing threat intelligence. In various embodiments, the present disclosure includes methods having (product recommending) steps, processing devices configured to implement the steps, cloud services configured to implement the steps, and non-transitory computer-readable media configured to store instructions for programming one or more processors to execute the steps.

According to one implementation, a method may include a step of extracting, from one or more sources, cybersecurity intelligence related to an online presence of an organization. The method further includes the step of analyzing the cybersecurity intelligence to determine a cybersecurity posture of the organization, whereby the cybersecurity posture is defined by at least a set of one or more cybersecurity issues. Also, the method includes the step of creating a cybersecurity product deployment recommendation to assist the organization with mitigating the set of one or more cybersecurity issues.

In some embodiments, the cybersecurity intelligence may include threat intelligence data related to one or more of threats to a domain of the organization, certificates issued by a weak or compromised Certificate Authority (CA), expired certificates, weak cryptographic details, and service interruptions. The cybersecurity intelligence may also include historical intelligence data related to previous hacking attempts, previous breaches, previous Distributed Denial of Service (DDoS) attacks, malware infections, and/or other types of security issues. The cybersecurity intelligence may also include security intelligence data related to brands associated with the organization and/or domains associated with the organization. Furthermore, the cybersecurity intelligence may include threat intelligence data, historical intelligence data, security intelligence data, geolocation intelligence data, reputation data, business case data, compromised email address data, and/or other types of data.

The extracting step may be performed in response to receiving an online request from the organization to receive a recommendation about purchasing one or more cybersecurity products or services. The one or more cybersecurity products or services, for example, may include a Secure Sockets Layer (SSL) certificate, a Transport Layer Security (TLS) certificate, a Verified Mark Certificate (VMC), an Extended Validation (EV) certificate, an email certificate, an X.509 certificate, and/or other types of certificates and security products. The product recommendation request may further include informational details about the organization, the informational details including at least one or more of an organization name, a domain name, and contact email information.

The one or more sources may include, for example, an internal source and one or more external sources. The internal source may include the functional elements and/or capabilities of a third-party entity associated with a trust system. The cybersecurity intelligence extracted from the one or more external sources may include a) data extracted from at least one or more of Certificate Transparency (CT) logs, b) a Censys analysis, c) Department of Homeland Security, d) Federal Bureau of Investigation (FBI), e) threat intelligence feeds, f) Open Threat Exchange (OTX) threat intelligence feeds, g) SANS, h) VirusTotal, i) VirusShare, j) Cisco Talos Intelligence, k) Google Safe Browsing, l) National Council of ISACs, m) The Spamhaus Project, and/or other sources that gather cybersecurity intelligence. In some embodiments, the cybersecurity posture may be based at least in part on existing security products and services currently protecting the organization. Also, the cybersecurity posture may include Common Vulnerabilities and Exposures (CVE) data.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a flow diagram illustrating a method for assisting an organization with the purchase of one or more cybersecurity products based on need, according to various embodiments.

DETAILED DESCRIPTION

Again, the present disclosure relates to systems and methods having the capability to automatically create deployment recommendations for cybersecurity based on threat intelligence, reputation data, and business case of a customer (or organization). For example, when an online user comes to a website to purchase cybersecurity products (e.g., Secure Sockets Layer (SSL) certificate, Verified Mark Certificate (VMC), email certificate, or other type cybersecurity products or services), the systems and methods of the present disclosure are configured to create product recommendations based on cybersecurity threat intelligence, reputation data, and business case of the customer. That is, the present disclosure provides intelligence in decision making based on real threats and risks.

Since it may be difficult for some users or administrators to understand the functionality of each of a large suite of available cybersecurity products in conjunction with the actual threat landscape, the systems and methods of the present disclosure are configured to perform an analysis of the organization's situation and then recommend one or more products that are appropriate for their situation. If a user comes to a purchase website for purchasing any cybersecurity product, the website owner can automatically create product recommendations for the customer based on cybersecurity threat intelligence, reputation data, and business use cases specific to the customer. In this manner, a customer (i.e., Information Technology (IT) personnel) can make optimized decisions for product deployment based on real threats.

Communication System

Figure 1:
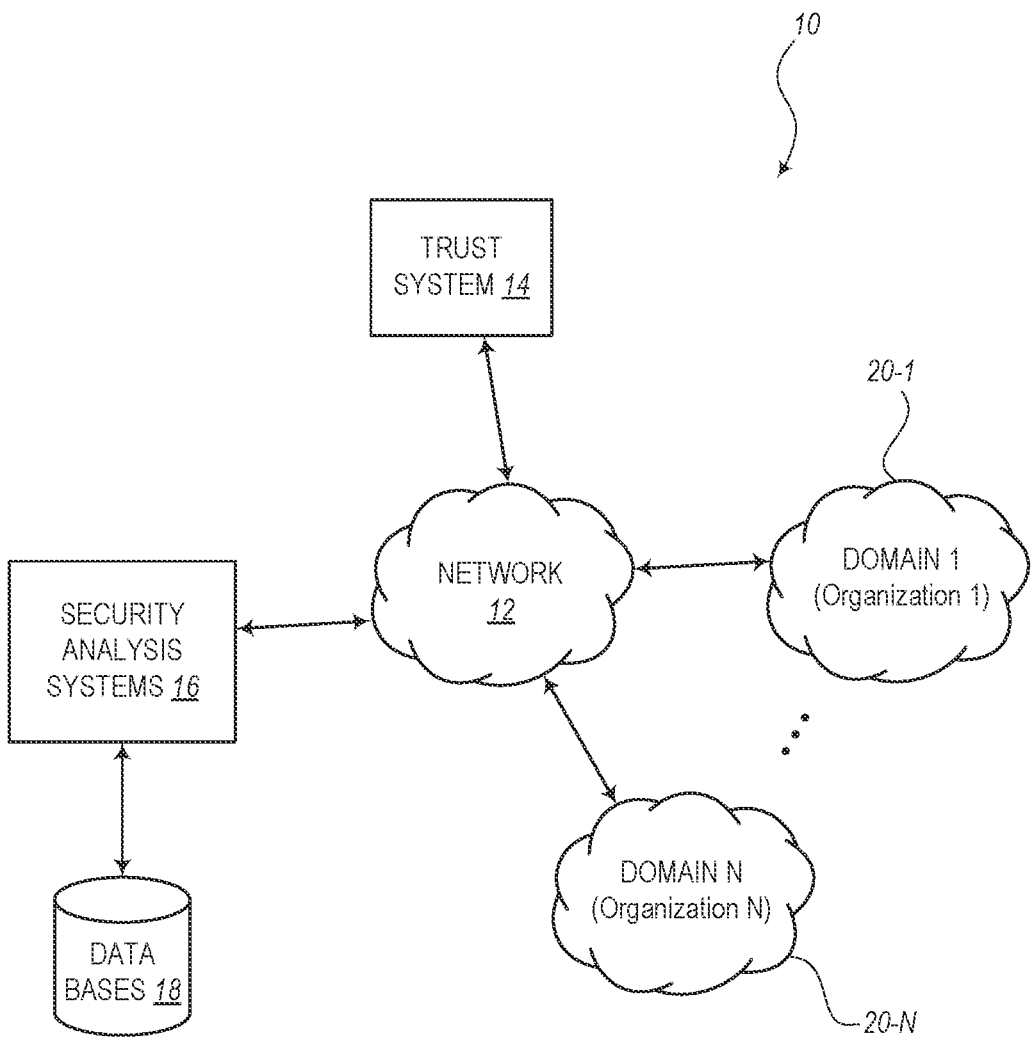
FIG. 1 is a diagram of a communication system for analyzing and managing cybersecurity, according to various embodiments.

FIG. 1 is a diagram showing an embodiment of a communication system 10 for managing cybersecurity products for one or more organizations. The communication system 10 allows communication via a network 12, such as a Wide Area Network (WAN), the Internet, etc. Also, the communication system 10 includes a trust system 14, which may be associated with a third-party entity, such as a Certificate Authority (e.g., DigiCert), for offering certain cybersecurity products for deployment thereof. Furthermore, according to the embodiments of the present disclosure, the trust system 14 may also be configured to determine the current status of an organization, with respect to security and the actual threat landscape, and recommend one or more cybersecurity products for the organization based on actual need. Therefore, not only can the trust system 14 sell products online, but also the trust system 14 can analyze the posture of the organization to determine what products will provide needed security features that can benefit the organization against future attacks.

In addition, the communication system 10 also includes a plurality of security analysis systems 16 and corresponding databases 18. The security analysis systems 16 may represent any number and type of external agencies or companies that can gather security intelligence about various organizations. This intelligence may be stored in the corresponding databases 18 and may be available to the trust system 14 either for free or for a cost. Thus, the trust system 14 can utilize the previously stored security information or intelligence and use this intelligence in the analysis of an organization's cybersecurity posture.

The communication system 10 also includes a plurality of domains 20-1 through 20-N, which may represent a number of organizations. That is, each organization may use their own domain, sub-system, sub-network, etc. An administrator associated with a domain 20 may contact the trust system 14 via the network 12 to request that an analysis be performed by the trust system 14 to determine the organization's cybersecurity posture. Based on the cybersecurity posture, the trust system 14 can make one or more recommendations as to products that can be purchased by the organization to mitigate any unresolved security issues.

Trust System

Figure 2:
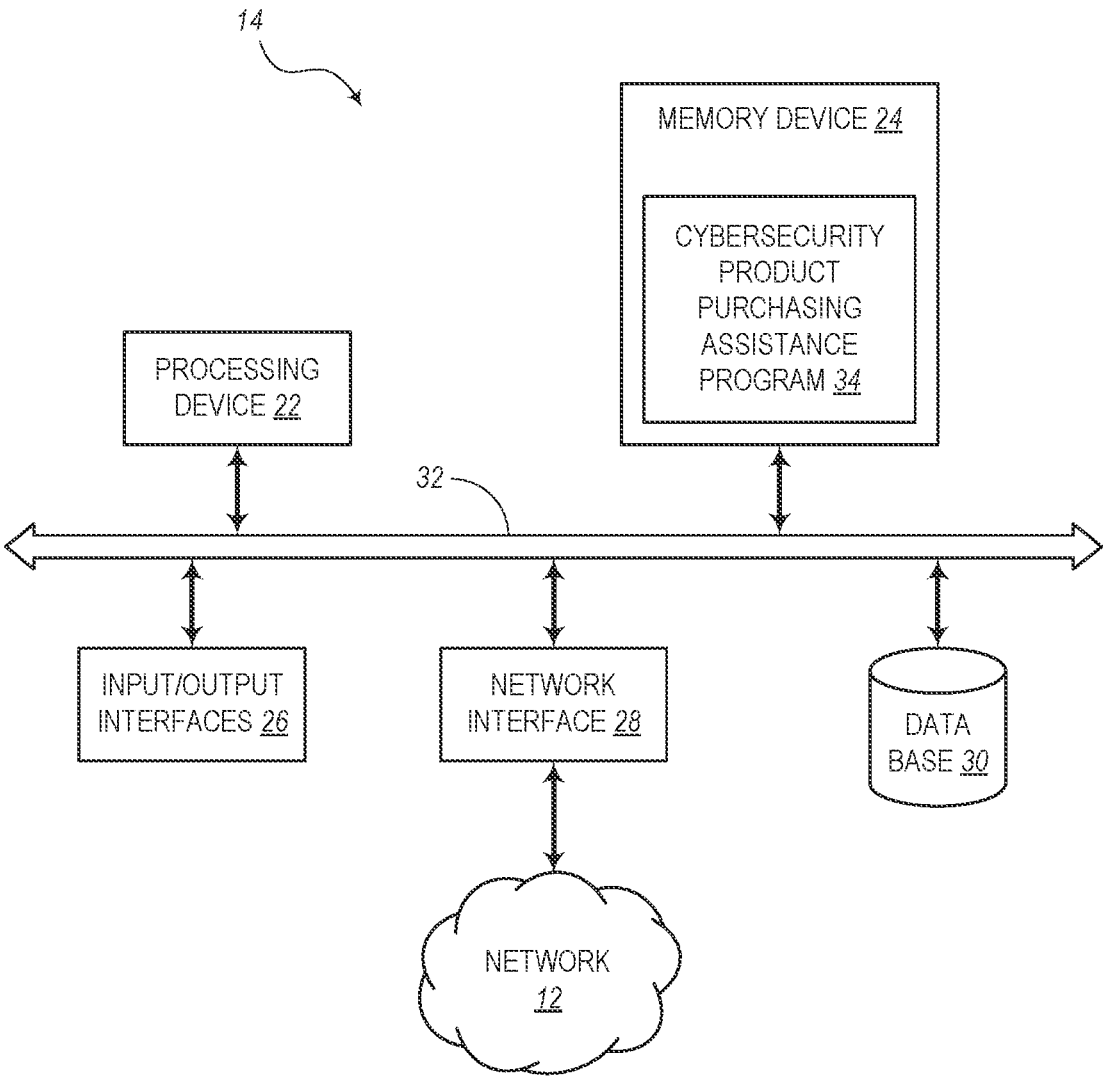
FIG. 2 is a block diagram of the trust system shown in FIG. 1, according to various embodiments.

FIG. 2 is a block diagram illustrating an embodiment of the trust system 14 shown in FIG. 1. The trust system 14 may be a digital computer that, in terms of hardware architecture, generally includes a processing device 22, memory device 24, input/output (I/O) interfaces 26, a network interface 28, and a database 30. It should be appreciated by those of ordinary skill in the art that FIG. 2 depicts the trust system 14 in an oversimplified manner, and a practical embodiment may include additional components and suitably configured processing logic to support known or conventional operating features that are not described in detail herein. The components (22, 24, 26, 28, 30) are communicatively coupled via a local interface 32. The local interface 32 may be, for example, but not limited to, one or more buses or other wired or wireless connections, as is known in the art. The local interface 32 may have additional elements, which are omitted for simplicity, such as controllers, buffers (caches), drivers, repeaters, and receivers, among many others, to enable communications. Further, the local interface 32 may include address, control, and/or data connections to enable appropriate communications among the aforementioned components.

The processing device 22 is a hardware device for executing software instructions. The processing device 22 may be any custom made or commercially available processor, a Central Processing Unit (CPU), an auxiliary processor among several processors associated with the trust system 14, a semiconductor-based microprocessor (in the form of a microchip or chipset), or generally any device for executing software instructions. When the trust system 14 is in operation, the processing device 22 is configured to execute software stored within the memory device 24, to communicate data to and from the memory device 24, and to generally control operations of the trust system 14 pursuant to the software instructions. The I/O interfaces 26 may be used to receive user input from and/or for providing system output to one or more devices or components.

The network interface 28 may be used to enable the trust system 14 to communicate on a network, such as the Internet. The network interface 28 may include, for example, an Ethernet card or adapter or a Wireless Local Area Network (WLAN) card or adapter. The network interface 28 may include address, control, and/or data connections to enable appropriate communications on the network. A database 30 may be used to store data. The database 30 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the database 30 may incorporate electronic, magnetic, optical, and/or other types of storage media. In one example, the data store 208 may be located internal to the trust system 14, such as, for example, an internal hard drive connected to the local interface 32 in the trust system 14. Additionally, in another embodiment, the database 30 may be located external to the trust system 14 such as, for example, an external hard drive connected to the I/O interfaces 204 (e.g., SCSI or USB connection). In a further embodiment, the data store 208 may be connected to the trust system 14 through a network, such as, for example, a network-attached file server.

The memory device 24 may include volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory device 24 may incorporate electronic, magnetic, optical, and/or other types of storage media. Note that the memory device 24 may have a distributed architecture, where various components are situated remotely from one another but can be accessed by the processing device 22. The software in memory device 24 may include one or more software programs, each of which includes an ordered listing of executable instructions for implementing logical functions. The software in the memory device 24 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

According to some embodiments, the trust system 14 may include a cybersecurity product purchasing assistance program 34, which may be implemented in any combination of hardware (e.g., in the processing device 22) and/or software/firmware (e.g., in the memory device 24). When implemented in the memory device 24 or other suitable non-transitory computer-readable media, the cybersecurity product purchasing assistance program 34 may include computer code or logic having instructions that enable or cause the processing device 22 to perform various functions related to assisting an administrator of an organization with purchasing decisions regarding security products that can improve the organization's posture in the security realm.

Of note, the general architecture of the trust system 14 can define any device described herein. However, the trust system 14 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

User Interface Examples

Figure 3A:
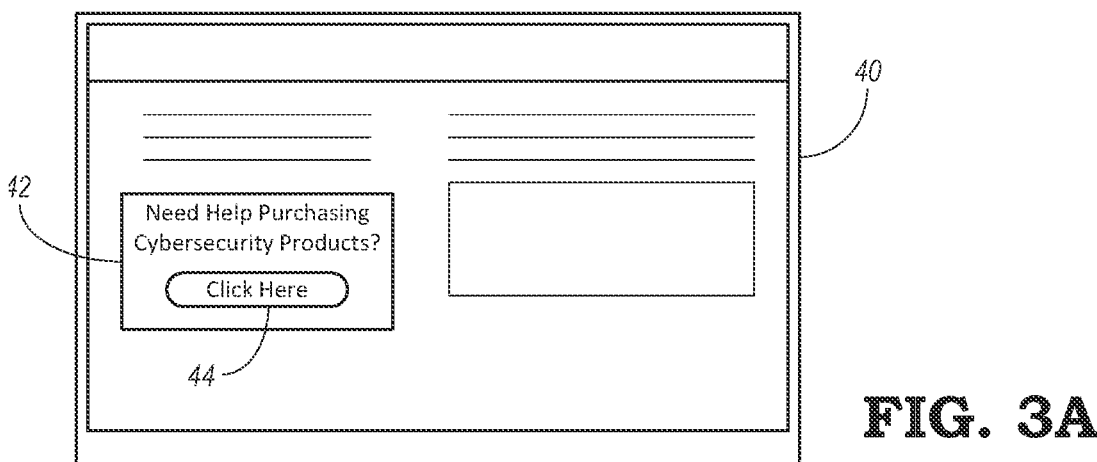
FIGS. 3A-3C are diagrams illustrating user interfaces for performing procedures related to assisting a client with purchasing cybersecurity products, according to various embodiments.
Figure 3B:
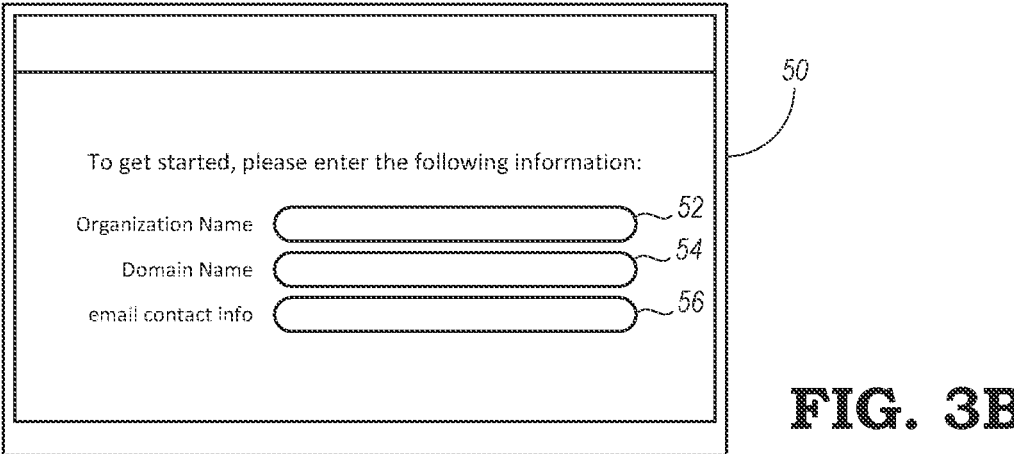
Figure 3C:
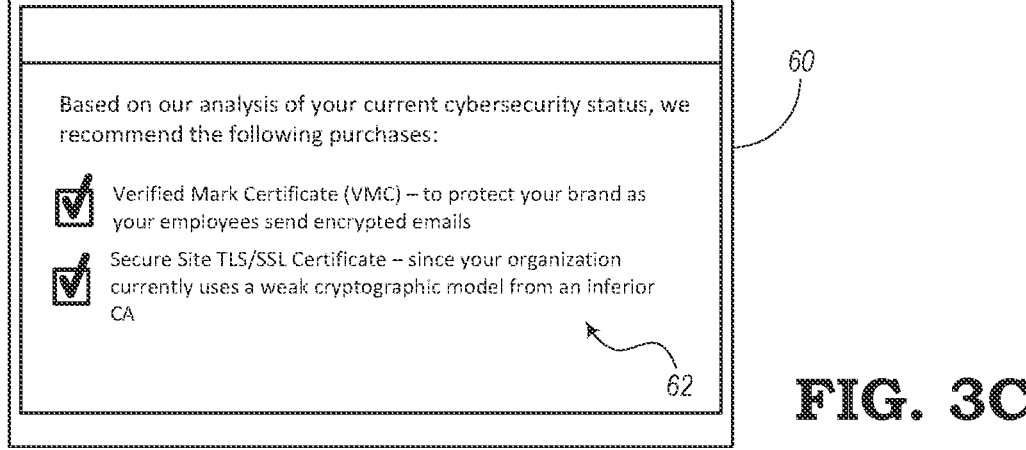

FIGS. 3A-3C are diagrams illustrating embodiments of user interfaces for performing procedures related to assisting a client with purchasing cybersecurity products. As shown in FIG. 3A, a user interface 40 shows a webpage or website (e.g., associated with the trust system 14). The webpage may include any suitable information and may have a notification 42 or announcement that offers the functionality of providing assistance with the purchase of online cybersecurity products and recommending one or more cybersecurity products based on need. The user (e.g., administrator) may click on a "Click Here" button 44 to get started with the product recommendation procedure.

In FIG. 3B, a user interface 50 may show a page where the user can directly enter information of the organization requesting product recommendations for any current cybersecurity needs. The user interface 50 includes a first field 52 where the user can enter the name of the organization. A second field 54 allows the user to enter the name of a domain associated with the organization. A third field 56 allows the user to enter email contact information (e.g., of the admin) to which the product recommendations can be sent.

In FIG. 3C, a user interface 60 may show a page that includes recommendations based on an analysis of the organization's cybersecurity posture. If it is determined that one or more product purchases are recommended, a number of suggestions 62 can be displayed in the user interface 60. Each of the suggestions 62 may include a specific product name or type of product. Also, each suggestion 62 may include an explanation for recommending the product (e.g., for filling in gaps in coverage, for providing services that may be needed for the particular type of the corporation, for replacing weak products with products that can provide better protection, etc.). In some embodiments, further explanations of the security issues may be provided to the customer. Also, contact information can be provided to the customer to allow the customer to contact a sales representative. Also, discounts and deals can be included to encourage the customer to purchase the products.

Cybersecurity Product Purchasing Recommendation Method

FIG. 4 is a flow diagram illustrating an embodiment of a method 70 for assisting an organization with the online purchase of one or more cybersecurity products based on need. As shown in FIG. 4, the method 70 includes the step of extracting, from one or more sources, cybersecurity intelligence related to an online presence of an organization, as indicated in block 72. The method 70 further includes the step of analyzing the cybersecurity intelligence to determine a cybersecurity posture of the organization, as indicated in block 74, whereby the cybersecurity posture is defined by at least a set of one or more cybersecurity issues. Also, the method 70 includes the step of creating a cybersecurity product deployment recommendation to assist the organization with mitigating the set of one or more cybersecurity issues, as indicated in block 76.

According to various embodiments, the method 70 may be configured in computer logic and stored in a non-transitory computer-readable medium (e.g., memory device 24) and may be configured to enable or cause one or more processors (e.g., processing device 22) to perform the steps of the method 70. In some embodiments, the method 70 may be executed by the trust system 14 shown in FIG. 1 for offering deployment recommendations to users associated with the organizations 1-N and domains 20-1 to 20-N.

In some embodiments, the cybersecurity intelligence may include threat intelligence data related to one or more of threats to a domain of the organization, certificates issued by a weak or compromised Certificate Authority (CA), expired certificates, weak cryptographic details, and service interruptions. The cybersecurity intelligence may also include historical intelligence data related to previous hacking attempts, previous breaches, previous Distributed Denial of Service (DDoS) attacks, malware infections, and/or other types of security issues. The cybersecurity intelligence may also include security intelligence data related to brands associated with the organization and/or domains associated with the organization. Furthermore, the cybersecurity intelligence may include threat intelligence data, historical intelligence data, security intelligence data, geolocation intelligence data, reputation data, business case data, compromised email address data, and/or other types of data.

The extracting step (block 62) may be performed in response to receiving an online request from the organization (e.g., when user clicks on the Click Here button 44) to receive a recommendation about purchasing one or more cybersecurity products or services. The one or more cybersecurity products or services, for example, may include a Secure Sockets Layer (SSL) certificate, a Transport Layer Security (TLS) certificate, a Verified Mark Certificate (VMC), an Extended Validation (EV) certificate, an email certificate, an X.509 certificate, and/or other types of certificates and security products. The product recommendation request may further include informational details about the organization, the informational details including at least one or more of an organization name, a domain name, and contact email information (e.g., entered via fields 52, 54, 56).

The one or more sources described in block 62 may include, for example, an internal source and one or more external sources. The internal source may include the functional elements and/or capabilities of a third-party entity associated with a trust system (e.g., trust system 14). The cybersecurity intelligence extracted from the one or more external sources may include a) data extracted from at least one or more of Certificate Transparency (CT) logs, b) a Censys analysis, c) Department of Homeland Security, d) Federal Bureau of Investigation (FBI), e) threat intelligence feeds, f) Open Threat Exchange (OTX) threat intelligence feeds, g) SANS, h) VirusTotal, i) VirusShare, j) Cisco Talos Intelligence, k) Google Safe Browsing, l) National Council of ISACs, m) The Spamhaus Project, and/or other sources that gather cybersecurity intelligence. In some embodiments, the cybersecurity posture may be based at least in part on existing security products and services currently protecting the organization. Also, the cybersecurity posture may include Common Vulnerabilities and Exposures (CVE) data.

Gathering Intelligence

Upon receiving a request (e.g., user clicking on the Click Here button 44) for receiving recommendations or suggestions pertaining to the purchase of one or more cybersecurity products, the cybersecurity product purchasing assistance program 34 of the trust system 14 is configured to automatically perform a search for information or intelligence regarding the status of the corporation with respect to cybersecurity. The trust system 14 can collect details directly from the user via fields 52, 54, 56 to determine the organization name, domain name, contact email, etc.

Furthermore, the trust system 14 is configured to obtain security details about the organization using internal search functionality built into the trust system 14 itself. In addition, the trust system 14 is able to obtain cybersecurity intelligence from the security analysis systems 16, which represent reputable cybersecurity sources. For example, the trust system 14 may be configured to look up data on the databases 18 associated with the security analysis systems 16, look up data previously stored in the database 30 of the trust system 14 itself, and/or obtain current analytic information about the current status of the organization.

From the searching and look-up processes, the following information can be extracted:

1. Threat intelligence—information about the domains (e.g., certificate issued by a weak or compromised CA etc.), service interruptions caused by expired certificates, known weak cryptographic details found in their infrastructure, etc. Simply using the organization name, domain name, and email contact information, the trust system 14 can extract the threat intelligence (e.g., using look-up tables, etc.) from reputable and trustworthy sources (e.g., security analysis systems 16), which may be available through different scans that are publicly available.

2. Historical intelligence—information about previous hacking attempts, breaches, attacks (e.g., Distributed Denial of Service (DDoS) attacks, etc.), malware infection on a site. When websites or email accounts are compromised, information about the attacks can be detected and recorded. Again, the trust system 14 can extract this recorded information. Regarding the concept of extracting intelligence from an external source (e.g., security analysis systems 16), the trust system 14 may pay some minimal amount to these other security companies or agencies. As mentioned earlier, the trust system 14 also includes internal capabilities to provide a) malware scanning, b) vulnerability scanning, c) quality scanning, etc. to obtain useful information without external help.

3. Security intelligence—information about brand names, organization names, etc. associated with the domain or organization being analyzed. This may be used to determine known breaches. Regarding the aspect of protecting brands, an organization (e.g., HDFC Bank in India, etc.) may wish to add security. In this case, it may be determined that the organization does not have a cybersecurity product (e.g., Verified Mark Certificate (VMC), etc.) to protect the brand. Other types of organizations may have other reasons for protecting brands. In the case where a web brand integrator is important to the organization, information about deficient or inadequate protection in this regard can be used by the trust system 14 to recommend the purchase of certain products (e.g., VMC) to mitigate any security issues and improve their cybersecurity posture. In an organization, it is usually important that employees send email messages using encryption to protect the brand. Also, in some cases, an organization may require its employees to digitally sign certain documents (e.g., loan applications, etc.), and, as such, may recommend certain products to cover or improve the organization's security in this regard. Another example includes a situation where an organization may need an Extended Validation (EV) certificate if they do not already have one or if one currently employed does not adequately protect their interests.

4. Geolocation specific intelligence—information about area-specific rules, standards, protocols, etc. for specific locations (e.g., countries, states, territories, provinces, cities, etc.) where an organization has a physical presence. If the organization includes vulnerabilities in this regard, certain products can be recommended. Deficiencies in geolocation-specific intelligence may be listed in a database of known Common Vulnerabilities and Exposures (CVE), which may be stored in a database (e.g., databases 18, 30). Using another banking example, suppose a bank (e.g., HDFC Bank) operating in a specific location (e.g., New Delhi, India) where there are several incidents of security breaches or attacks at a particular time, such as a prominent bank may likely be a target as well. With the geolocation data, the trust system 14 can provide insight to the bank and suggest some security products for handling the known incidents.

5. Email address intelligence—information about a domain or organization having email breaches. For example, a list of emails that have been hacked or compromised (or "pwned") in the past can be found on a reputable source, such as "haveibeenpwned.com." This information can also be used to recommend certain email protection products.

Collecting External Intelligence

As mentioned above, the trust system 14 can gather cybersecurity intelligence from internal functionality, such as a) malware scanning, b) vulnerability scanning, c) quality scanning, etc. Also, the trust system 14 can collect intelligence from reputable external sources, including, for example, the following:

1. Certificate Transparency (CT) logs, Censys logs, etc.
2. Department of Homeland Security: Automated Indicator Sharing, CISA Automated Indicator Sharing (AIS) Threat Intelligence Feed
3. FBI: InfraGard Portal
4. Abuse.ch, Blocklist.de Threat Intelligence Feed, AlienVault OTX Threat Intelligence Feed
5. SANS: Internet Storm Center, CrowdSec Threat Intelligence Feeds
6. VirusTotal: VirusTotal
7. Cisco: Talos Intelligence
8. VirusShare: VirusShare Malware Repository
9. Google: Safe Browsing
10. National Council of ISACs: Member ISACs
11. The Spamhaus Project: Spamhaus Threat Bill of Material In an embodiment, the cybersecurity intelligence is threat intelligence data and can be aggregated in a so-called Threat Bill of Material (TBOM). Conventional a Bill of Material (BOM) is a comprehensive list of parts, items, assemblies, and other materials required to create a product, along with instructions for how to assemble the product from the components listed. It acts as an essential document in the manufacturing process, serving several critical functions, including detailing components, quantity specification, assembly instructions, etc. The present disclosure uses this concept with the threat intelligence data. This is where we can cryptographically signed any threat intelligence including their sources and the final collective report from multiple sources with a valid timestamp and certificate from a valid CA.

Determining Cybersecurity Needs

Thus, the trust system 14 is configured to gather this intelligence regarding the specific organization. From this intelligence, the trust system 14 is further configured to analyze the data to determine the cybersecurity needs of the organization. In some cases, the organization may already have some security products already in place for protection. In other cases, the organization may have security products that are not necessarily needed for their type of company. Therefore, an overall picture of the organization's needs is determined.

The security posture can be determined based on the Threat Bill of Materials associated with the organization. The various threat intelligence data in the Threat Bill of Materials can be combined to score different cybersecurity risks for the organization. In an embodiment, the overall score can change if or when false data is identified, such as based on the cryptographical signing of the Threat Bill of Materials. The Threat Bill of Materials can be reported or it can reside on a publicly available ledger where changes or modifications can be tracked.

Determining a Security Posture of an Organization

Also, the trust system 14 is configured to determine the kinds of cybersecurity products that the organization currently uses and those that they do not use. Also, the trust system 14 may also determine certain features of their products that are either turned on or turned off to find out what security features are currently in place. This and other information can be used to determine the security posture of the organization. Based on the current status regarding security products in use versus the security needs of the organization related to the extracted intelligence, the trust system 14 is configured to make recommendations or suggestions for purchasing additional cybersecurity products to adequately protect the organization.

Recommending Cybersecurity Products

If it is determined that the organization has certain security needs, based on current and past threats, the trust system 14 can recommend certain products (FIG. 3C). The recommendations or suggestions may include no products (if the organization is adequately covered) or one or more products (if the organization has some security issues that have not been addressed).

An administrator of an organization may not be aware of certain security issues and can therefore benefit from a trusted analysis. In some cases, a developing country may have certain threats or breaches that can diminish the trust in a reputable company if their security needs are not addressed on a regular basis. Therefore, the administrator may wish to obtain a recommendation periodically. Otherwise, if holes in security are not spotted or addressed, an organization may be compromised, which, of course, can lead to mistrust of the organization and may be detrimental to the organization's survival.

The trust system 14 may utilize Machine Learning (ML) models, Artificial Intelligence (AI), and/or other types of rules-based algorithms and techniques for performing the various functions described herein. That is, ML models can be trained from historic data and re-trained with newly acquired security data. The trust system 14 may perform ML inference using past and current data to predict future cybersecurity needs of an organization. Thus, ML and AI procedures may be able to gather cybersecurity intelligence pertaining to an organization, determine their cybersecurity needs, determine their current posture (e.g., including unresolved issues), and recommend one or more products that can overcome or mitigate any unresolved cybersecurity issues. Additional purchasing processes may also be incorporated in order to allow an administrator to purchase products or services as needed.

An example of an overall process of the trust system 14 may include the following. Upon receiving a request for product recommendations for an organization and receiving general information about the organization, the trust system 14 may use common lookup processed to gather intelligence. For example, the trust system 14 may determine if there are any EV certificates issued from a particular domain. The trust system 14 can perform a comprehensive lookup process through CT logs or Censys logs recorded over a certain time period. For example, suppose the CT logs indicate that in December of 2023, for example, the organization (e.g., ICICI Bank) has a weak or defective VMC issued by some Certificate Authority (e.g., Comodo). Upon researching data of the ICICI certificate, the trust system 14 may determine that the certificate has many mis-issuances, weaknesses, and/or other problems. In this case, the trust system 14 may recommend that the organization purchase a reliable product (e.g., Extended Validation (EV) TLS/SSL Certificate from DigiCert).

Certificates, when issued from a CA, are logged into a server called Certificate Transparency (CT) logs server, Censys collects data from Certificate Transparency (CT)

logs, which are publicly auditable repositories of TLS certificates. By indexing this data, Censys allows users to search for specific TLS certificates or monitor changes over time. It is possible to use this data to analyze TLS certificates for various purposes, such as identifying trends in certificate usage, assessing certificate configurations for vulnerabilities or misconfigurations, and investigating certificate chains and issuers. This information can help researchers understand the broader landscape of TLS deployment and potential security risks. Any of these sources mentioned (including the internal sources) can provide actional threat intelligence about specific organization, domain, email etc. which can be used in my system to automatically recommend solution/product.

Example Recommendations

The objective of the present disclosure is to assist IT in purchasing and deploying cybersecurity products. That is, there are always resource limitations—it is not possible to deploy all possible cybersecurity products. Further, IT may not really understand the underlying risks. To that end, the present disclosure includes steps of gathering information and analyzing the information to understand an organization's posture and to recommend the best cybersecurity products to mitigate risks based on the actual posture (threat intelligence). The following provide some non-limiting examples of recommendations based on threat intelligence.

(1) For example, a customer (organization) has a reputed brand and as per our threat intelligence input, they are frequently targeted for phishing attacks, based on this intelligence, the present disclosure would be able to automatically suggest brand indicator digital email certificate, e.g., a Verified Mark Certificate (VMC), which promotes the brand and reduce the chances of phishing. VMCs are digital certificates that enable organizations to display their registered trademark logo in outgoing emails. That is, a correlation between brand reputation and phishing threats with a remediation of a VMC.

(2) For example, a customer has a reputed brand and their internal employees handle sensitive information through emails, are frequently targeted stealing sensitive data, then the present disclosure would be able to automatically suggest digital email certificates, such as Secure/Multipurpose Internet Mail Extensions (S/MIME) certificates, S/MIME can encrypt email. Based on the company side, it can also suggest different types of SMIME certificates best suited for them, e.g., S/MIME for Business which supports multiple user emails. That is, correlation between sensitive data handling, stealing, and encryption thereof.

(3) For example, a customer runs a supply chain which has faced or might be exposed to hackers targeting unprotected code-signing private keys, insecure code-signing and build infrastructure, etc., then our system could automatically recommend tools for scanning and signing code, etc., such as the DigiCert Trust Manager.

(4) For example, the threat intelligence shows the customer had a service interruption because of certificate management issues, such as expiration of certificates, issuance of weak key certificates, an inability to upgrade weak key certificates, etc. (e.g., weak can be SHA1, etc.), then the present disclosure can recommend a service to automate certificate management, such as the DigiCert Trust Lifecycle Manager.

(5) For example, the customer is new to SSL and requires a reputed marker in their site, need to start using TLS/SSL certificate for their external servers with ease, then the present disclosure could recommend a package of SSL certificates which provide benefits such as CT log monitoring, a site seal, Malware and Vulnerability scan features and ease of managing the certificates though Representational state transfer (REST) Application Programming Interfaces (APIs), etc.

Machine Learning

The above examples refer to rules-based algorithms where expertise is captured in threat intelligence and directly correlated to cybersecurity products, i.e., if . . . then. In another embodiment, it is possible to train a machine learning model to provide such recommendations. That is, a CA, e.g., tracks and understand their customers, their security posture, their growth, their ever-changing domain, email and other digital identities that need to be protected against potentials threat/vulnerability attacks. etc., as well as tracking threat intelligence from the various sources described herein. It is possible to use this data to train a machine learning model as well as to keep updating the machine learning model. As product deployments come up, the machine learning model can automatically apply its updated knowledge and recommend the latest solutions best suited for the customer's need. That is, machine learning models can be trained from historic data that we know about the customer as well as with various threat intelligence sources above, and retrained over time, the model as we discover new digital footprint (domain, email, brand etc.) or new threats exposed that directly or indirectly correlate with customers.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A trust system comprising:

a processing device; and a memory device configured to store computer logic having instructions that, when executed, cause the processing device to perform steps of:

automatically extracting, via one or more application programming interface (APIs) from a plurality of internal and external data sources, cybersecurity intelligence related to an online presence of an organization, the cybersecurity intelligence including certificate information, domain reputation information, and threat intelligence data;

normalizing and correlating the cybersecurity intelligence into a unified cybersecurity-posture dataset representing current network assets and certificate trust relationships of the organization;

analyzing the cybersecurity intelligence to determine a cybersecurity posture of the organization, the cybersecurity posture being defined by at least a set of one or more cybersecurity issues; and creating by a recommendation engine executed by a processing device, a cybersecurity product deployment recommendation comprising one or more actions, configurations, or certificates to assist the organization with mitigating the set of one or more cybersecurity issues.

2. The trust system of claim 1, wherein the cybersecurity intelligence includes threat intelligence data related to one or more of threats to a domain of the organization, certificates issued by a weak or compromised Certificate Authority (CA), expired certificates, weak cryptographic details, and service interruptions, wherein the threat intelligence data is automatically retrieved from live Certificate Transparency (CT) logs or equivalent public feeds.

3. The trust system of claim 1, wherein the cybersecurity intelligence includes historical intelligence data related to one or more of previous hacking attempts, previous breaches, previous Distributed Denial of Service (DDOS) attacks, and malware infections.

4. The trust system of claim 1, wherein the cybersecurity intelligence includes security intelligence data related to one or more of brands associated with the organization and domains associated with the organization, and the processing device correlates the brand-related data with domain and certificate data to detect impersonation or spoofing events.

5. The trust system of claim 1, wherein the cybersecurity intelligence includes at least one or more of threat intelligence data, historical intelligence data, security intelligence data, geolocation intelligence data, reputation data, business case data, and compromised email address data, and wherein the processing device assigns weighted confidence scores to each data type for use in determining the cybersecurity posture.

6. The trust system of claim 1, wherein the extracting step is performed in response to receiving an online request from the organization to receive a recommendation about deploying one or more cybersecurity products or services, the request being received through a secure application-programming interface or management portal.

7. The trust system of claim 6, wherein the one or more cybersecurity products or services include at least one or more of a Secure Sockets Layer (SSL) certificate, a Transport Layer Security (TLS) certificate, a Verified Mark Certificate (VMC), an Extended Validation (EV) certificate, an email certificate, and an X509 certificate, and wherein the recommendation identifies automated issuance or renewal of at least one of the certificates through a certificate-management interface of a certificate authority.

8. The trust system of claim 6, wherein the online request further includes informational details about the organization, the informational details including at least one or more of an organization name, a domain name, and contact email information, and wherein the system authenticates the organization using the informational details before performing extraction of cybersecurity intelligence.

9. The trust system of claim 1, wherein the one or more sources include an internal source and one or more external sources, wherein the internal source includes capabilities of a third-party entity associated with the trust system and wherein the external sources are asynchronously polled by a data-ingestion module that performs schema normalization of received data.

10. The trust system of claim 9, wherein the cybersecurity intelligence extracted from the one or more external sources includes data extracted from at least one or more of Certificate Transparency (CT) logs, a Censys analysis, Department of Homeland Security, Federal Bureau of Investigation (FBI), threat intelligence feeds, Open Threat Exchange (OTX) threat intelligence feeds, SANS, VirusTotal, VirusShare, Cisco Talos Intelligence, Google Safe Browsing, National Council of ISACs, and The Spamhaus Project each being accessed via a respective API or structured data feed.

11. The trust system of claim 1, wherein the cybersecurity posture is based at least in part on existing security products and services currently protecting the organization, and the analysis includes identifying configuration or coverage gaps among the existing products and services.

12. The trust system of claim 1, wherein the cybersecurity posture includes Common Vulnerabilities and Exposures (CVE) data, the CVE data being automatically mapped to the organization's network assets or certificates using an asset-fingerprinting process.

13. A method comprising steps of:

automatically extracting, via one or more application programming interface (APIs) from a plurality of internal and external data sources, cybersecurity intelligence related to an online presence of an organization, the cybersecurity intelligence including certificate information, domain reputation information, and threat-intelligence data;

normalizing and correlating the cybersecurity intelligence into a unified cybersecurity-posture dataset representing current network assets and certificate trust relationships of the organization;

analyzing the cybersecurity intelligence to determine a cybersecurity posture of the organization, the cybersecurity posture being defined by at least a set of one or more cybersecurity issues; and creating, by a recommendation engine executed by a processing device, a cybersecurity product deployment recommendation comprising one or more actions, configurations, or certificates to assist the organization with mitigating the set of one or more cybersecurity issues.

14. The method of claim 13, wherein the cybersecurity intelligence includes threat intelligence data related to one or more of threats to a domain of the organization, certificates issued by a weak or compromised Certificate Authority (CA), expired certificates, weak cryptographic details, and service interruptions, wherein the threat intelligence data is automatically retrieved from live Certificate Transparency (CT) logs or equivalent public feeds.

15. The method of claim 13, wherein the cybersecurity intelligence includes historical intelligence data related to one or more of previous hacking attempts, previous breaches, previous Distributed Denial of Service (DDOS) attacks, and malware infections.

16. The method of claim 13, wherein the cybersecurity intelligence includes security intelligence data related to one or more of brands associated with the organization and domains associated with the organization, and the processing device correlates the brand-related data with domain and certificate data to detect impersonation or spoofing events.

17. The method of claim 13, wherein the cybersecurity intelligence includes at least one or more of threat intelligence data, historical intelligence data, security intelligence data, geolocation intelligence data, reputation data, business case data, and compromised email address data and wherein the processing device assigns weighted confidence score to each data type for use in determining the cybersecurity posture.

18. A non-transitory computer-readable medium configured to store computer logic having instructions for enabling one or more processing devices to perform steps of:

automatically extracting, via one or more application programming interface (APIs), from a plurality of internal and external data sources, cybersecurity intelligence related to an online presence of an organization, the cybersecurity intelligence including certificate information, domain reputation information, and threat-intelligence data;

normalizing and correlating the cybersecurity intelligence into a unified cybersecurity-posture dataset representing current network assets and certificate trust relationships of the organization;

analyzing the cybersecurity intelligence to determine a cybersecurity posture of the organization, the cybersecurity posture being defined by at least a set of one or more cybersecurity issues; and creating, by a recommendation engine executed by a processing device, a cybersecurity product deployment recommendation comprising one or more actions, configurations, or certificates to assist the organization with mitigating the set of one or more cybersecurity issues.

19. The non-transitory computer-readable medium of claim 18, wherein the extracting step is performed in response to receiving an online request from the organization to receive a recommendation about deploying one or more cybersecurity products or services, wherein the one or more cybersecurity products or services include at least one or more of a Secure Sockets Layer (SSL) certificate, a Transport Layer Security (TLS) certificate, a Verified Mark Certificate (VMC), an Extended Validation (EV) certificate, an email certificate, and an X509 certificate, and wherein the online request further includes informational details about the organization, the informational details including at least one or more of an organization name, a domain name, and contact email information.

20. The non-transitory computer-readable medium of claim 18, wherein the one or more sources include an internal source and one or more external sources, wherein the internal source includes capabilities of a third-party entity associated with a trust system, and wherein the cybersecurity intelligence extracted from the one or more external sources includes data extracted from at least one or more of a) Certificate Transparency (CT) logs, b) a Censys analysis, c) Department of Homeland Security, d) Federal Bureau of Investigation (FBI), e) threat intelligence feeds, f) Open Threat Exchange (OTX) threat intelligence feeds, g) SANS, h) VirusTotal, i) VirusShare, j) Cisco Talos Intelligence, k) Google Safe Browsing, l) National Council of ISACs, and m) The Spamhaus Project, each being accessed via a respective API or structured data feed.

* * * * *